May 24, 1955 D. PORRET 2,709,177
METHOD OF PROLONGING THE PERIOD OF ACTIVITY OF CUPROUS SALT CATALYSTS IN THE SYNTHESIS OF ACRYLONITRILE
Filed Aug. 29, 1951
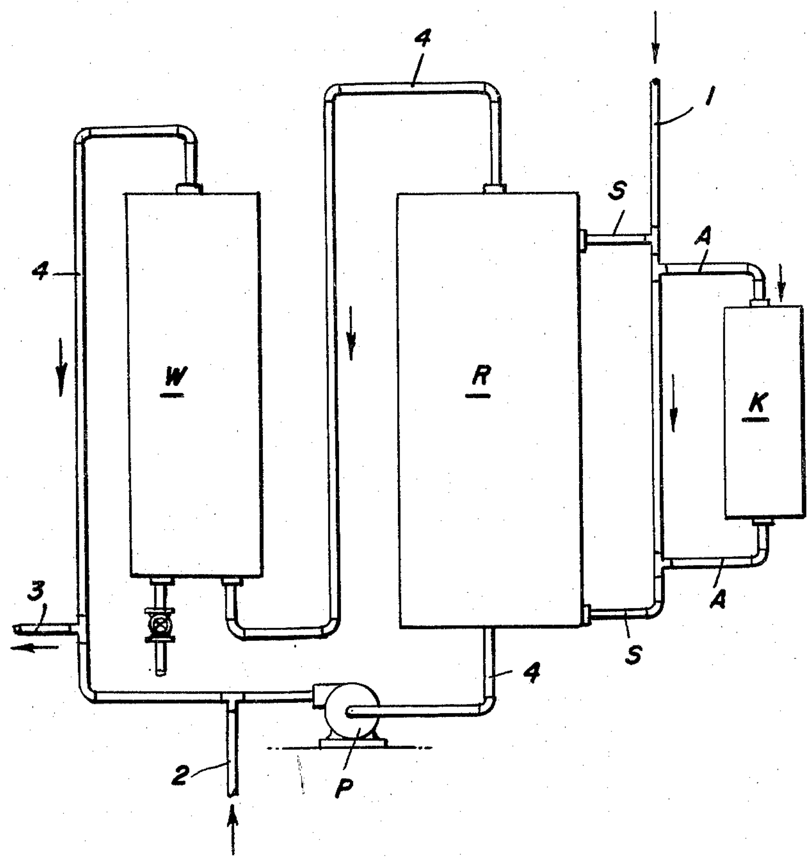
INVENTOR
DANIEL PORRET,
BY Ihenderoth, Lind + Ponack
ATTORNEYS United States Patent Office 2,709,177

Patented May 24, 1955

1

2,709,177

METHOD OF PROLONGING THE PERIOD OF ACTIVITY OF CUPROUS SALT CATALYSTS IN THE SYNTHESIS OF ACRYLONITRILE

Daniel Porret, Monthey, Switzerland, assignor to Ciba Limited, Basel, Switzerland, a Swiss firm Application August 29, 1951, Serial No. 244,184

Claims priority, application Switzerland September 8, 1950

6 Claims. (Cl. 260—465.3)

It is known that acrylonitrile can be made by reacting together acetylene and hydrocyanic acid in the presence of an aqueous cuprous salt catalyst in accordance with the following equation $$CH{\equiv}CH + HCN \rightarrow CH_2{=}CH{-}CN$$

The reaction is advantageously carried out at about 80–100° C.

Among the cuprous salt catalysts hitherto used for this synthesis, the so-called Nieuwland catalyst has been found especially suitable. This catalyst is most frequently used in the form of a mixture of 45.5 parts of cuprous chloride, 24.5 parts of ammonium chloride, 2.4 parts of concentrated hydrochloric acid and 42 parts of water, the parts being by weight. The ammonium chloride may, however, be replaced by an equivalent quantity of a mixture of potassium chloride and sodium chloride, and instead of hydrochloric acid there may be used other strong acids, such as hydrobromic acid, sulfuric acid or phosphoric acid. Depending on the reaction conditions the relative proportions of the components may vary within certain limits.

In the commercial process the catalyst mixture is heated in a reaction tower at 70–100° C., and acetylene is passed through the hot mixture and hydrocyanic acid is simultaneously introduced dropwise. The acrylonitrile so formed is removed from the reaction tower by the current of acetylene, dissolved out of the gas stream by absorption in water or by condensation, and then isolated by fractional distillation, the excess of acetylene being returned to the reaction tower. In this process the acetylene may be diluted by the addition of an inert gas such as nitrogen.

The duration of this continuous process is limited by the fact that the activity of the catalyst is strongly diminished, inter alia, by the formation of resinous and gummy by-products, so that after a certain time the synthesis must be interrupted in order to renew the total quantity of catalyst.

The fresh Nieuwland catalyst, when hot, is a clear liquid having a yellowish color. During the synthesis of acrylonitrile the catalyst becomes red-brown and finally black, and oily droplets and solid by-products separate out which in time clog the apparatus and impair the activity of the catalyst. In practice it is generally necessary to renew the catalyst when the quantity of acrylonitrile formed in unit time has fallen to about one half of that which is formed when the catalyst is fresh. The copper can be separated from spent catalyst by the addition of zinc dust, and then worked up into fresh catalyst.

The by-products which diminish the activity of the catalyst are formed, on the one hand, from impurities derived from the acetylene used, for example, diacetylene and allylene, and, on the other, from other unsaturated compounds, such as vinyl-acetylene, divinyl-acetylene and cyanobutadiene, which are formed in small amounts as by-products in the synthesis of acrylonitrile, and also from acrylonitrile itself.

2

It has already been proposed to remove the primary impurities which lead to the formation of by-products, in order to prolong the period of activity of the cuprous salt catalyst. For this purpose the fresh acetylene to be used is previously purified by washing it with a high boiling solvent, or with an oil or sulfuric acid. However, it is almost impossible in this way to remove the impurities completely. The acetylene has also been subjected to purification during its circulation, and before it enters the reaction tower, in order to remove vinyl-acetylene and divinyl-acetylene. For this purpose the gaseous mixture is cooled to a low temperature, for example, −70° C., or the gas is passed through active carbon. This expedient also fails to prevent completely the formation of undesired polymerisation products, so that the period of activity of the catalyst is prolonged only to a relatively short extent.

The present invention is based on the observation that the period of activity of cuprous salt catalysts in the synthesis of acrylonitrile from hydrocyanic acid and acetylene can be considerably prolonged in a simple manner by removing by-products from the catalyst by adsorption during the synthesis.

As adsorption media for use in the present process there are suitable solid surface-active inorganic or organic carrier substances. Among the inorganic substances there may be mentioned, for example, surface-active earths such as kieselguhr, and above all active carbon, such as animal charcoal or active carbon from blood. As organic adsorption media there may be mentioned artificial resins, such as aminoplasts and phenoplasts.

The adsorption on the carrier substances is carried out by bringing the catalyst into contact with the adsorption medium. This can be carried out by suspending the adsorption medium in the catalyst itself. However, in this case the catalyst must be separated from the adsorption medium by filtration when the latter is exhausted. It is therefore more advantageous to incorporate the adsorption medium in a special vessel, through which at least a part of the catalyst is passed, and which is preferably easily interchangeable, for which purpose it is arranged outside the reaction tower. The removal of by-products may be carried out discontinuously, but continuous operation is preferred. An example of apparatus suitable for continuous operation is illustrated diagrammatically in the accompanying drawing.

As shown in the drawing, it is of advantage to extend the branch pipe system S connected to the reaction tower R by means of a further branched pipe system A connected at the top and bottom. The branch system A is advantageously so constructed that a vessel K, which contains the adsorption medium, is inserted interchangeably. When the adsorption medium is renewed the catalyst liquid retained therein can be recovered by blowing it out with gas. During the synthesis of acrylonitrile the greater part of the catalyst is returned to the tower by way of the branch system S and only a part of the catalyst contaminated with by-products is passed through the branch system A and over the adsorption medium which adsorbs the by-products. The purified catalyst leaving the adsorption vessel returns to the reaction tower.

In other respects the synthesis of acrylonitrile is carried out in known manner.

The hydrocyanic acid may be used in a concentrated form, or the present process may be combined with the process described in U. S. patent application Ser. No. 237,636, filed July 19, 1951, by Alfred Goerg and Arwed Grob, now Patent No. 2,692,276, in which acrylonitrile is made with the use of dilute hydrocyanic acid.

The acetylene necessary for the sythesis may be used in concentrated form or if desired diluted with an inert gas such as nitrogen. It is suitable to use acetylene which has been produced in an electric arc and which is advantageously used in a purified and enriched form.

The present invention is distinguished from the known methods of prolonging the period of activity of cuprous salt catalysts in that the catalyst itself is purified, whereas in the known methods substances which are passed through the catalyst have been purified, namely the fresh acetylene or the acetylene being circulated. The present method provides a much more effective purification, because the impurities are removed from the place where they exert a harmful influence. Especially effective is the purification when, in addition to removing the impurities and by-products from the catalyst, the gas mixture leaving the washing tower and also the fresh acetylene are purified. This is especially recommended when acetylene from an electric arc is used.

The following example illustrates the invention:

An apparatus suitable for the synthesis is illustrated diagrammatically in the accompanying drawing. The apparatus consists in the main of the reaction tower R, of which the main branch system S is connected with a further branch system A, in which is inserted an interchangeable vessel K for the adsorption medium, and also of a washing tower W in which the acrylonitrile is separated by washing. The two towers are connected by a pipe 4 for the circulating gas, the circulation of which is maintained by the pump P. The hydrocyanic acid in an anhydrous liquid form or in the form of an aqueous solution is introduced through the pipe 1. The system is supplied with fresh acetylene through the pipe 2, and a portion of the circulating gas is removed through the pipe 3.

In order to commence the synthesis 5 liters of Nieuwland catalyst are charged into an apparatus of a suitable capacity to contain it. The catalyst consists of 35.2 per cent. of water, 40.8 per cent. of cuprous chloride, 22.0 per cent. of ammonium chloride, 0.6 per cent. of copper powder and 1.4 per cent. of concentrated hydrochloric acid. The catalyst is heated to about 80° C. and nitrogen is passed through the system by means of the pipe 2, which also causes the catalyst to circulate through the tower R and the branch system S. The catalyst is first charged with hydrocyanic acid from the pipe 1. As soon as the nitrogen leaving the reaction tower contains about 0.5 gram of hydrocyanic acid per 100 liters, the nitrogen is replaced by acetylene, and the formation of acrylonitrile sets in immediately. At the outset of the synthesis the branch system A is not connected. About ½ hour after the commencement of the synthesis the initially clear yellow catalyst becomes red. After 3 days it is brown-red and very dark, and small drops of oil begin to separate out. At this point the branch system A, of which the arsorption vessel K is charged with 500 grams of active carbon, is connected. After 1 or 2 hours the catalyst begins to become paler in color and finally acquires almost its original color. The branch system A remains continuously connected, so that a part of the catalyst continuously flows over the adsorption medium. After about 7–8 days the catalyst begins again to assume a red-brown color, which indicates that the adsorption medium is exhausted. The active carbon is therefore exchanged, and the catalyst becomes pale again. After repeating these operations for a period of 4 weeks the catalyst has the same appearance as at the outset and the yield of acrylonitrile is the same as when fresh catalyst is used. The yield amounts to about 75 grams of acrylonitrile per hour, which represents a yield of 75–80 per cent. calculated on the acetylene and of 80–85 per cent, calculated on the hydrocyanic acid.

What is claimed is:

1. A method of prolonging the period of activity of the aqueous cuprous salt catalyst in the synthesis of acrylonitrile from hydrocyanic acid and acetylene, which comprises removing non-volatile by-products, remaining in the catalyst, from the catalyst during the synthesis by adsorption on a solid surface-active carrier substance, the adsorption of the by-products being carried out upon the catalyst circulating in a subsidiary circulation system.

2. A method of prolonging the period of activity of the aqueous cuprous salt catalyst in the synthesis of acrylonitrile from hydrocyanic acid and acetylene, which comprises removing non-volatile by-products, remaining in the catalyst, from the catalyst during the synthesis by adsorption on active carbon, the adsorption of the by-products being carried out continuously upon the catalyst circulating in a subsidiary circulation system.

3. A method of prolonging the period of activity of the aqueous cuprous salt catalyst in the synthesis of acrylonitrile from hydrocyanic acid and acetylene, which comprises removing non-volatile by-products, remaining in the catalyst, from the catalyst during the synthesis by adsorption on active carbon, the adsorption of the by-products being carried out continuously upon the catalyst circulating in a subsidiary circulation system, and the active carbon being placed in a vessel interchangeably connected in the subsidiary circulation system.

4. A method of prolonging the period of activity of the aqueous cuprous salt catalyst in the synthesis of acrylonitrile from hydrocyanic acid and acetylene, which comprises removing non-volatile by-products, remaining in the catalyst, from the catalyst during the synthesis by adsorption on active carbon, the adsorption of the by-products being carried out continuously upon the catalyst circulating in a subsidiary circulation system, the active carbon being placed in a vessel interchangeably connected in the subsidiary circulation system, and which method comprises in addition to the purification of the catalyst purifying the circulating gas mixture and the fresh acetylene.

5. A method of prolonging the period of activity of the aqueous cuprous salt catalyst in the synthesis of acrylonitrile from hydrocyanic acid and acetylene, said catalyst being the Nieuwland-catalyst consisting of a mixture of 45.5 parts of cuprous chloride, 24.5 parts of ammonium chloride, 2.4 parts of concentrated hydrochloric acid and 42 parts of water, the parts being by weight, which comprises removing non-volatile by-products, remaining in the catalyst, from the catalyst during the synthesis by adsorption on active carbon, the adsorption of the by-products being carried out continuously upon the catalyst circulating in a subsidiary circulation system, the active carbon being placed in a vessel interchangeably connected in the subsidiary circulation system, and which method comprises in addition to the purification of the catalyst purifying the circulating gas mixture and the fresh acetylene.

6. A method of prolonging the period of activity of the aqueous cuprous salt catalyst in the synthesis of acrylonitrile from hydrocyanic acid and acetylene, said catalyst being the Nieuwland-catalyst consisting of a mixture of 45.5 parts of cuprous chloride, 24.5 parts of ammonium chloride, 2.4 parts of concentrated hydrochloric acid and 42 parts of water, the parts being by weight, which comprises removing non-volatile by-products, remaining in the catalyst, from the catalyst during the synthesis at 70–100° C. by adsorption on active carbon, the adsorption of the by-products being carried out continuously upon the catalyst circulating in a subsidiary circulation system, the active carbon being placed in a vessel interchangeably connected in the subsidiary circulation system, and which method comprises in addition to the purification of the catalyst purifying the circulating gas mixture and the fresh acetylene.

References Cited in the file of this patent

UNITED STATES PATENTS 2,385,327 Bradley et al. ---------- Sept. 25, 1945
2,409,124 Heuser ---------------- Oct. 8, 1946